106-90                AU 115        EX
11/15/77         OR    4,058,406

United States Patent [19]

Raponi

[11] 4,058,406
[45] Nov. 15, 1977

[54] CEMENTITIOUS COMPOSITION

[76] Inventor: Dante A. Raponi, Box 9602, Panama City, Fla. 32401

[21] Appl. No.: 653,755

[22] Filed: Jan. 30, 1976

Related U.S. Application Data

[63] Continuation-in-part of Ser. No. 660,618, Aug. 15, 1967, abandoned, which is a continuation-in-part of Ser. No. 369,302, May 21, 1964, abandoned.

[51] Int. Cl.$^2$ ................................................ C04B 7/35
[52] U.S. Cl. ........................................ 106/90; 106/99; 260/29.65
[58] Field of Search ................ 106/90, 99; 260/29.65, 260/42.13; 52/659

[56] References Cited

U.S. PATENT DOCUMENTS 3,044,547   7/1962   Jarboe ................................. 106/99

*Primary Examiner*—J. Poer
*Attorney, Agent, or Firm*—Duckworth, Hobby, Orman, Allen & Pettis

[57] ABSTRACT

A cementitious composition for the molding of relatively light-weight, heat-insulative, nailable, structural units such as bricks, blocks, roof decking, etc. The composition comprises an inorganic cementitious settable admixture within which is incorporated a significant proportion of a waste polyethylene consisting substantially of polyethylene derived from the reclamation of cellulosic fiber from fiberboard to which a polyethylene coating material was previously adhered. Additionally, the composition comprises a significant proportion of industrial waste commonly termed stack dust and/or fly ash as aggregate.

8 Claims, No Drawings

CEMENTITIOUS COMPOSITION

This application is a continuation-in-part of my presently pending application Ser. No. 660,618, filed Aug. 15, 1967, now abandoned, which was a continuation-in-part of my prior application Ser. No. 369,302, filed May 21, 1964, now abandoned.

BACKGROUND OF THE INVENTION

1. Field of the Invention

The present invention relates to a cementitious composition for the molding of light-weight structural units and more particularly to a cementitious sand/stack dust/fly ash aggregate containing admixture which incorporates a significant proportion of a waste polyethylene material in strip form. The invention further embraces the method of preparing the cementitious composition for end use.

2. Description of the Prior Art

As is well-known in the building industry, molded blocks and other structural units are used quite extensively in the fabrication of masonry structures and the like. It is desirable that such blocks be relatively inexpensive, of a density suitable to allow fastening devices to be inserted therein, insulative, relatively light-weight, and yet sufficiently strong so as to be suitable for the desired utility. It is further desirable that such blocks present an appearance which is aesthetically pleasing. Recent attempts at satisfying each of these criteria with a single product have been adequate, but generally leave much to be desired.

For example, it is well-known in the prior art to utilize themoplastic additives in the form of pellets to provide compositions for the purpose of improving and varying their appearance. Of course, it seems apparent that the addition of such pellets will adversely affect, to a measurable degree, the load-bearing capabilities of the final product prepared from such a composition. Accordingly, the cement compositions are generally recommended for use only in relatively thin layers on top of another material such as a conventional concrete product.

Furthermore, in order to provide a pleasing appearance the thermoplastic additives must be of relatively uniform sizes and configurations. This necessarily increases the cost of such compositions and products prepared therefrom.

In an attempt to reduce the cost of cement compositions and end-use products manufactured from cement, the present state of the art recognizes the utilization of fly ash, which is an industrial waste, as an aggregate in the preparation of cement compositions. Of course, fly ash has also been used as a replacement for at least a portion of the portland cement element present in cement compositions.

More recently, as the availability of aggregate has diminished for commercial use there has been an attendant increase in the cost of cement mixtures and products made from cement. While the utilization of fly ash in cement composition is clearly a step in the right direction, both in conservation and in cost reduction, there is still a great need in the art for other cement-type products to meet the ever-increasing demand while at the same time maintaining a relatively stable cost factor. Accordingly, there is a need in the art for a novel composition for the molding of relatively light-weight structural units wherein heretofore useless waste materials may be utilized to produce a strong, insulative composition for the molding of structural units. Of course, such a cementitious composition should be able to withstand radical changes in temperature without seriously affecting the structural integrity of units manufactured therefrom, and it would further be desirable if the elements of such a composition could be selectively varied to render the composition suitable for the molding of structural units primarily desired for their insulative properties as opposed, for example, to structural units molded from a composition primarily intended to be utilized for their compressive strength. Finally, it is also desirable that such a composition provide an attractive appearance in the final end product.

SUMMARY OF THE INVENTION

The present invention relates to a cementitious composition for the molding of structural units, to structural units manufactured from the cementitious composition, and to the process utilized in preparing the cementitious settable composition. Most simply stated, the composition comprises an inorganic cementitious settable admixture within which is incorporated a significant proportion of industrial waste material consisting substantially of polyethylene strips and stack dust and/or fly ash.

Inasmuch as a significant feature of the present invention resides in the utilization of waste polyethylene material, the manner in which such material is derived as well as the general nature of the material will now be described in greater detail. The polyethylene is a heretofore substantially useless waste product derived from the manufacturing of polyethylene-coated fiberboard cups and containers or the like. In the container manufacturing industry a considerable amount of polyethylene-coated fiberboard scrap material is generated during cutting and trimming of sheets utilized to form the containers. Since these scraps represent an economic loss, particularly due to their predominant cellulosic fiber content, they are generally reprocessed in order to extract the "contaminate" polyethylene coating so as to facilitate recovering the cellulosic fiber. In one container manufacturing plant in excess of 30,000 tons of waste polyethylene is discarded yearly in public dumps. The waste polyethylene material consists mainly of polyethylene, in the order of about 98 percent, and about 2 percent of other materials which predominantly comprise cellulosic fibers.

Thus, it will be understood that the waste polyethylene referred to herein is derived and has the approximate analysis as set forth above. Accordingly, it will be appreciated that the nature of the waste polyethylene utilized has been set forth in as definitive a manner as is possible in view of the fact that the specific makeup of the waste polyethylene unavoidably varied from time to time.

Additionally, the waste polyethylene utilized in the present invention is preferably cut into elongated, ribbon-like strips. For purposes of illustration, these strips are preferably on the order of 8 inches long and ¼ inch wide. Preferably, then, the strips are about 32 times as long as they are wide. In the final product, the polyethylene strips are not visible, but their effect is quite apparent. The polyethylene strips impart greater grip and permanence to fastening devices such as screws, nails, etc. This improvement is attributable to the flat ribbon-like shape of the strips and the fact that they overlap and interlink in the present invention. Greater moisture impermeability is also a result of the use of polyethylene strips. Not only does polyethylene offer great resistance to moisture penetration, but also the ribbon-like shapes tend to randomly overlap forming a further physical barrier to penetration by moisture.

As discussed above, the present invention further contemplates the use of stack dust or fly ash in combination with the sand, perlite, vermiculite, such as that sold by W. R. Grace & Co. under the trademark ZONO-LITE, etc. widely used as aggregate in cement and cementitious mixtures. Stack dust is a by-product of commercial portland cement manufacturing operations, and is presently considered to be without value in concrete. Quite to the contrary, however, it has been determined that stack dust is quite suitable for use in the cementitious composition of the present invention. Fly ash, of course, is a well-known by-product of coal burning plants. Since both stack dust and fly ash are considered to be undesirable by-products, and even pollutants, it is to be understood that their quality and precise composition may vary widely depending upon, for example, their source, the temperatures attained in the cement manufacturing facility, the quality of the coal burned, and the equipment and operation of the steam plant. Accordingly, it will be appreciated that the nature of the stack dust and fly ash utilized has been set forth in as definitive a manner as is possible.

The synthetic resin-inorganic cementitious settable composition utilized to mold structural units in accordance with the present invention comprises, on the basis of volume, approximately one to four parts polyethylene strips, two to eight parts aggregate, one to two parts of a hydraulic cement, such as portland or lime-containing cement, and one to four parts water. The aggregate is selected from a group consisting of sand, stack dust, fly ash, perlite and vermiculite. However, as will be set forth in greater detail hereinafter, perlite and vermiculite are not used together in the same mixture. Finally, as indicated above, the process for preparing the composition of the present invention is unique when compared with that currently used in the preparation of cement products. The present mixture of concrete calls for an adding of all aggregates to the cement before any addition of water. This mixing procedure has proved to be unsatisfactory for preparing the composition of the present invention. Rather, the water and polyethylene strips are first mixed, next the cement is added, and finally the selected aggregate is admixed.

The proportions of the compounds used in the present composition determine the resilience of the structural unit molded therefrom, and, accordingly, selectively varying the proportions in a predetermined manner contributes to the versatility of the resulting structural units. Units formed from the composition are suitable for the reception of nails, screws, staples, glue, plaster, paint, and may be drilled. Additionally, when compared with presently available concrete products, the units exhibit markedly increased waterproof qualities. Structural units molded of the compostion of the present invention will only absorb approximately 20 percent of their own weight when submerged completely in water for as long as 30 days with no additional precautions taken to enhance the waterproof qualities of the units prior to their being submerged. Compressive strength testing of a structural unit produced utilizing the waste of polyethylene-cementitious composition of the present invention have sustained compression of as high as 354,240 pounds per square foot without fracturing. Other test blocks which have been intentionally provided with fractures running 50 percent to 60 percent of the distance through the units have been subjected to a compressive load of the order set forth and still remain intact.

A plank 18 inches wide, 4 inches thick and 72 inches long with two ⅝ inch reinforcing bars embedded therein and molded from a composition as set forth herein, after being permitted to cure for eight days in the mold, was supported at either end by 4 inch bearings. A stress of 2,068 pounds was applied to the plank, at its center point, and the plank did not fracture or collapse but merely deflected about ¾ inch. After removal of the stress the plank made a full recovery within 20 minutes. This test demonstrates the use of polyethylene strips in the present invention imparts a greater tensile strength and resiliency to this invention than is found in the prior art. This is primarily due to the overlapping and interlinking of the polyethylene strips.

Furthermore, cured structural units produced in accord with this invention are fire resistant in that an exemplary test an oxygen-acetylene torch producing a flame having a temperature of about 7,000° F. was applied to a 2 inch block without any significant damage. For comparison purposes, a 2 inch block of concrete, when subjected to the same flame for the same period of time (18 seconds) exploded and shattered. A 2 inch thick block of asbestos had a hole burned completely through it.

Finally, standard frequency test conducted with concrete and with the cementitious composition of the present invention show that cured structural units produced in accordance with this invention exceed concrete in sound reduction by about 43 percent. For example, an 8 inch thick concrete block transmiteed 50 decibels of sound. A 4 inch block produced in accordance with this invention transmitted only 15 to 18 decibels of sound.

The invention accordingly comprises a composition possessing the characteristics, properties, and the relation of constituents which will be exemplified in the composition hereinafter described, a process comprising the several steps and the relation of one or more of such steps with respect to each of the others, which will be exemplified in the process hereinafter disclosed, and a product possessing the features, properties and the relation of components which will be exemplified in the product hereinafter described, and the scope of the invention will be indicated in the claims.

DETAILED DESCRIPTION

The following examples are set forth in order to fully describe the composition and process of the present invention.

In each of the following examples, each of the ingredients of the composition are expressed in parts, by volume. Furthermore, as will be set forth in greater detail hereinafter, each of the ingredients is listed in the preferred order of their addition one to another in the process for preparing the inventive composition.

EXAMPLE I

A waste polyethylene-cementitious composition was formed by intimately admixing, on the basis of volume:

| | |
|---|---|
| Polyethylene Strips | 3.6 parts |
| Water | 2.4 parts |
| Hydraulic Cement | 1.0 part |

| | |
|---|---|
| Aggregate (sand) | 5.2 parts |

The above waste polyethylene-cementitious composition was then molded and cured under ambient conditions in the mold for approximately eight days to develop substantially complete compressive strength. Structural units so produced were found to have a compressive strength in the order of 68,400 pounds per square foot without sustaining fracturing.

EXAMPLE II

A waste polyethylene-cementitious composition was formulated and intimately admixed utilizing:

| | |
|---|---|
| Polyethylene Strips | 1.5 parts |
| Water | 2.3 parts |
| Hydraulic Cement | 1.0 part |
| Aggregate (sand) | 5.0 parts |

Structural units molded from the above composition were cured as in Example I. Tests conducted thereon indicated that the structural units had a compressive strength in the order of 269,280 pounds per square foot without sustaining significant fracturing.

EXAMPLE III

A waste polyethylene-cementitious composition was formulated and intimately admixed utilizing:

| | |
|---|---|
| Polyethylene Strips | 2.34 parts |
| Water | 2.34 parts |
| Hydraulic Cement | 1.0 part |
| Aggregate (sand) | 5.07 parts |

Structural units, such as blocks, molded from the above composition and cured in the mold under ambient conditions for approximately eight days were subjected to standard compressive strength tests and found to have a compressive strength in the order of 178,560 pounds per square foot without sustaining any significant fracturing. Furthermore, and as indicated above, flame retardant and water absorption tests conducted on the product produced were highly suitable for utilization in installations where fire resistance and water impermeability are significant factors. In addition, the structural units formed were found to be highly receptive to the use of mechanical fasteners, adhesives and plaster.

EXAMPLE IV

A waste polyethylene-cementitious composition was formulated and intimately admixed utilizing:

| | |
|---|---|
| Polyethylene Strips | 1.0 part |
| Water | 1.34 parts |
| Hydraulic Cement | 1.0 part |
| Aggregate (sand, stack dust and perlite) | 3.5 parts |

EXAMPLE V

A waste polyethylene-cementitious composition was formulated and intimately admixed utilizing:

| | |
|---|---|
| Polyethylene Strips | 2.0 parts |
| Water | 2.67 parts |
| Hydraulic Cement | 1.0 part |
| Aggregate (stack dust and perlite) | 8.0 parts |

EXAMPLE VI

A waste polyethylene-cementitious composition was formulated and intimately admixed utilizing:

| | |
|---|---|
| Polyethylene Strips | 1.69 parts |
| Water | 1.69 parts |
| Hydraulic Cement | 1.0 parts |
| Aggregate (sand and fly ash) | 3.59 parts |

EXAMPLE VII

A waste polyethylene-cementitious composition was formulated and intimately admixed utilizing:

| | |
|---|---|
| Polyethylene Strips | 2.35 parts |
| Water | 2.35 parts |
| Hydraulic Cement | 1.0 part |
| Aggregate (sand) | 5.0 parts |

EXAMPLE VIII

A waste polyethylene-cementitious composition was formulated and intimately admixed utilizing:

| | |
|---|---|
| Polyethylene Strips | 1.0 part |
| Water | 1.0 part |
| Hydraulic Cement | 2.0 parts |
| Aggregate (perlite) | 6.0 parts |

EXAMPLE IX

A waste polyethylene-cementitious composition was formulated and intimately admixed utilizing:

| | |
|---|---|
| Polyethylene Strips | 1.0 part |
| Water | 1.0 part |
| Hydraulic Cement | 1.0 part |
| Aggregate (vermiculite) | 2.0 parts |

EXAMPLE X

A waste polyethylene-cementitious composition was formulated and intimately admixed utilizing:

| | |
|---|---|
| Polyethylene Strips | 1.0 part |
| Water | 3.0 parts |
| Hydraulic Cement | 2.0 parts |
| Aggregate (vermiculite) | 6.0 parts |

EXAMPLE XI

This example is generally presented for the purpose of more specifically detailing the process utilized in preparing the cementitious composition of the present application. Each of the preceding Examples I-X, inclusive, should be consulted in combination with the disclosure presented in this Example XI.

As indicated above, the cementitious composition of the present invention is prepared in a manner unlike that of presently known and utilized cement and cementitious mixtures. The process utilized in the present invention may be schematically presented in the following sequential steps:

1. First, the predetermined quantities of polyethylene strips and water are intimately mixed.

2. Next, the corresponding amount of hydraulic cement is added to the water-polyethylene mixture and thoroughly mixed.

3. Finally, the aggregate is admixed, and the resulting cementitious composition is ready for production of the end-use product. As shown in the preceding examples, a variety of aggregate components may be utilized. Regardless of the aggregate combination chosen the individual components are preferably added in the following order:
   a. Stack Dust
   b. Sand
   c. Perlite
   d. Vermiculite
   e. Fly Ash Again, with specific regard to the preceding examples, it should be noted that at no time are both perlite and vermiculite utilized in the aggregate formulation for a single cementitious composition prepared in accord with this invention.

It will thus be seen that the objects set forth above, among those made apparent from the preceding description, are efficiently attained, and, since certain changes may be made in the above composition and process without departing from the scope of the invention, it is intended that all matter contained in the above description shall be interpreted as illustrative and not in a limiting sense.

It is also to be understood that the following claims are intended to cover all of the generic and specific features of the invention described, and all statements of the scope of the invention which, as a matter of language, might be said to fall therebetween.

Particularly, it is to be understood that in said claims, ingredients or compounds recited in the singular are intended to include compatable mixtures of such ingredients wherever the sense permits.

Now that the invention has been described, What is claimed is:

1. A synthetic resin-inorganic cementitious settable composition, said composition consisting essentially of, by volume:
   a. about 1-4 parts polyethylene strips;
   b. about 2-8 parts aggregate;
   c. about 1-2 parts hydraulic cement; and
   d. about 1-4 parts water.

2. The composition of claim 1 wherein said aggregate is selected from the group consisting of sand, cement stack dust, fly ash, perlite and vermiculite and mixtures of one another.

3. The composition of claim 1 wherein said hydraulic cement is selected from the group consisting of portland and lime-containing portland cement and mixtures of one another.

4. The composition of claim 1 wherein said polyethylene strips have a longitudinal dimension about thirty-two times that of their width.

5. A synthetic resin-inorganic cementitious settable composition, said composition consisting essentially of, by volume:
   a. about 1.7 parts polyethylene strips;
   b. about 3.6 parts aggregate selected from the group consisting of sand, cement stack dust, fly ash and mixtures of one another;
   c. about 1 part hydraulic cement selected from the group consisting of portland and lime-containing portland cement and mixtures of each other; and
   d. about 1.7 parts water.

6. A structural unit molded from a synthetic resin-inorganic cementitious settable composition consisting essentially of, by volume, about 1-4 parts polyethylene strips; about 2-8 parts aggregate selected from the group consisting of sand, cement stack dust, fly ash, perlite and vermiculite and mixtures of one another; about 1-2 parts hydraulic cement selected from the group consisting of portland and lime-containing portland cement and mixtures of one another; and about 1-4 parts water.

7. A process for preparing a synthetic resin-inorganic cementitious settable composition, said process comprising the steps of:
   a. mixing about 1-4 parts, by volume, polyethylene strips and about 1-4 parts, by volume, water;
   b. admixing about 1-2 parts, by volume, hydraulic cement to the mixture of step (a); and
   c. admixing about 2-8 parts, by volume, aggregate to the mixture of step (b).

8. A process as in claim 7 wherein said admixing of said aggregate comprises:
   a. selecting said aggregate from the group consisting of sand, cement stack dust, fly ash, perlite and vermiculite, mixtures of said sand, stack dust, fly ash and perlite, and mixtures of said sand, stack dust, fly ash and vermiculite; and
   b. adding said aggregate sequentially in the following order: stack dust, sand, perlite, vermiculite, fly ash.

* * * * *